Nov. 17, 1959

H. A. HANSEN ET AL 2,913,645

VARIABLE CAPACITOR

Filed Dec. 24, 1956

2 Sheets-Sheet 1

INVENTORS.
Harry A. Hansen,
William F. Paterson
& Carl L. Peters

BY H. L. Newton
ATTORNEY.

Nov. 17, 1959 H. A. HANSEN ET AL 2,913,645

VARIABLE CAPACITOR

Filed Dec. 24, 1956 2 Sheets-Sheet 2

INVENTORS.
Harry A. Hansen,
William F. Paterson
& Carl L. Peters

BY H. D. Newton

ATTORNEY.

United States Patent Office 2,913,645

Patented Nov. 17, 1959

2,913,645

VARIABLE CAPACITOR

Harry A. Hansen, Bellmawr, William F. Paterson, Stratford, and Carl L. Peters, Medford, N.J., assignors to Radio Corporation of America, a corporation of Delaware

Application December 24, 1956, Serial No. 630,315

6 Claims. (Cl. 317—249)

This invention relates to variable capacitors, and more particularly relates to continuously variable multi-section capacitors for the tuning of signal receivers and the like.

In the development of electronic equipment such as radio signal receivers, the trend toward miniaturization has resulted in demands for smaller and smaller component parts. This has been particularly true with respect to variable tuning capacitors, the most commonly used type being the parallel-plate, air-dielectric type of capacitor which is relatively bulky in size, and requires a disproportionate space for installation in proportion to other electronic components in a receiver. When these capacitors are used as the tuning elements for radio receivers, two or more units are mechanically ganged together for unicontrol operation, adding even further to the size of the unit.

Although it is particularly desirable to provide a tuning capacitor of small physical dimensions it is also desirable to provide some form of trimming capacitance for one of the tuning capacitor sections as a tracking adjustment. Furthermore, it is desirable that the miniature unit be comprised of components which may be easily manufactured at low cost, and be capable of easy assembly by semi-skilled labor while maintaining tolerances of the finished product within relatively narrow limits.

It is an object of this invention to provide an improved plural-section variable tuning capacitor of miniature size having a separately adjustable trimmer capacitor for at least one section thereof, which does not materially add to the size of the unit.

It is another object of this invention to provide an improved variable tuning capacitor of simplified and rugged construction which is of small physical size and simple construction, which can be uniformly made in large quantities at low cost.

A miniature multi-section variable capacitor embodying the invention includes a rotatable capacitor plate, and a separate fixed plate for cooperation therewith supported parallel to and closely adjacent the rotatable plate, but separated therefrom by a suitable insulating material having a high dielectric constant. If both the rotatable capacitor plate and the fixed plate have relatively rigid flat planar surfaces, minor deformities in one of the other of the surfaces introduce air gaps adjacent the dielectric material. These air gaps seriously affect the incremental change in capacitance as the rotor plate is moved, and prevent accurately controlled tracking of this capacitor with another capacitor unit with which it is ganged. This, of course, is undesirable in most instances such as where two different variable capacitors of different sections of the same capacitor are used to tune the signal selection and oscillator circuits of a radio receiver in predetermined tracking relation over a range of signal frequencies as mentioned above. To eliminate this difficulty, the fixed plate of the capacitor is of a flexible material and the rotatable plate is supported in a relatively rigid surface. A resilient pressure pad is positioned to urge the flexible element into intimate conformity with the surface of the rigid element with only the dielectric material being interposed therebetween, thereby avoiding air pockets and insuring accurate incremental control of the capacitance of the variable capacitor.

In accordance with the invention, a tuning capacitor stator plate and a trimmer capacitor stator plate of flexible material such as a conductive coating or a metal foil are supported on a common flexible sheet of insulating material. The flexible sheet is adapted to be folded over a resilient pressure pad of the type described above so that the pressure pad is sandwiched between the trimmer capacitor plate and the tuning capacitor stator plate. The entire assembly is clamped between a pair of rigid backing members one of which may comprise the movable element of the capacitor, to compress the resilient pad and urge the flexible plates on opposite sides of the pressure pad into intimate conformity with the respective rigid backing members. A second relatively movable trimmer capacitor plate may be mounted on the rigid backing member adjacent the trimmer stator plate.

The manufacture of a variable tuning capacitor in accordance with the invention has been simplified since the main tuning capacitor stator plate and the trimming capacitor stator plate can be deposited on the flexible sheet in a single operation by a printed circuit process or the like and may comprise different portions of the same pattern. Alternatively, or in addition to the trimmer plate, a conductive path may be formed on the sheet extending from the tuning capacitor plate to a conductive terminal area which is adapted to make contact with a circuit connection terminal for the tuning capacitor when the extension is folded into position. This construction permits a simplified assembly of the tuning capacitor due to the improved accessibility of the circuit connection terminals.

The assembly of the various parts of the tuning capacitor is facilitated since both the main tuning capacitor stator and the trimmer stator may be assembled as a unit, and by proper prepositioning of the pattern on the flexible sheet the alignment of these plates with the cooperating rotor plates is simplified. Additionally, this construction provides a trimmer capacitance with virtually no increase in the size of the unit and at very little additional cost.

It is a further object of this invention to provide an improved tuning capacitor of miniature size having trimming capacitance means and easily accessible circuit connection terminals associated therewith, which may be quickly and easily assembled while maintaining substantial uniformity when manufactured in mass quantities.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
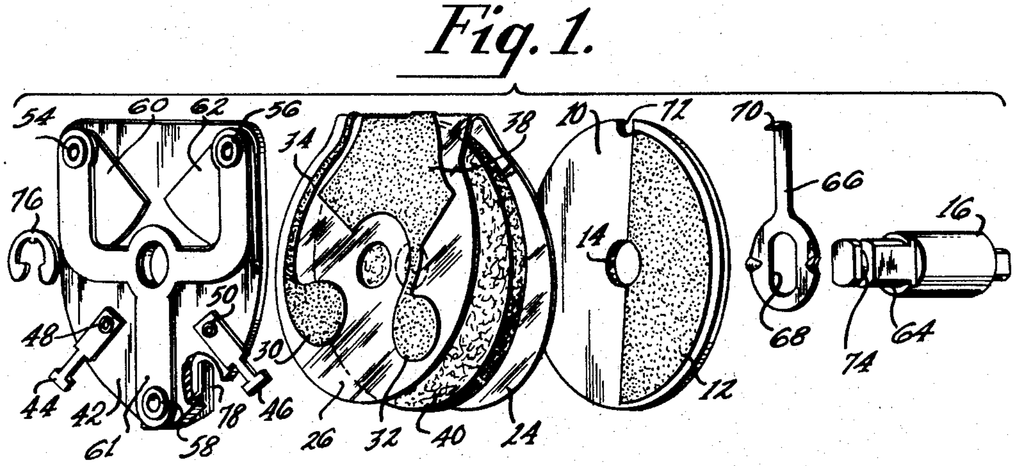
Figure 1 is an exploded view, in perspective, of a miniature tuning capacitor embodying the invention.

Referring now to the drawings wherein like reference characters are used to designate similar components throughout, a two-section miniature tuning capacitor embodying the invention includes a circular rotatable disc 10 of insulating material such as a steatite ceramic. The disc 10 provides a rigid backing member for a conductive plate 12 of semi-circular configuration which is the common rotor plate for the two-section capacitor. The conductive plate 12 may be deposited on the disc 10 by a printed circuit process or the like. By way of example, a thin film of conductive material such as silver may be deposited over the entire disc 10 and the undesired portions selectively etched away. A portion of the conductive plate 12 extends to and within a central aperture 14 in the disc 10 to make electrical contact with a conductive shaft 16 which extends therethrough.

The rotor plate 12 is coated with a dielectric material (not shown), such as glass, silicon resin, or a plastic possessing suitable electrical and mechanical characteristics, such as Teflon. This coating may be applied by dipping or spraying and processing in accordance with well-known techniques.

Figures 2, 3, 4, 5:
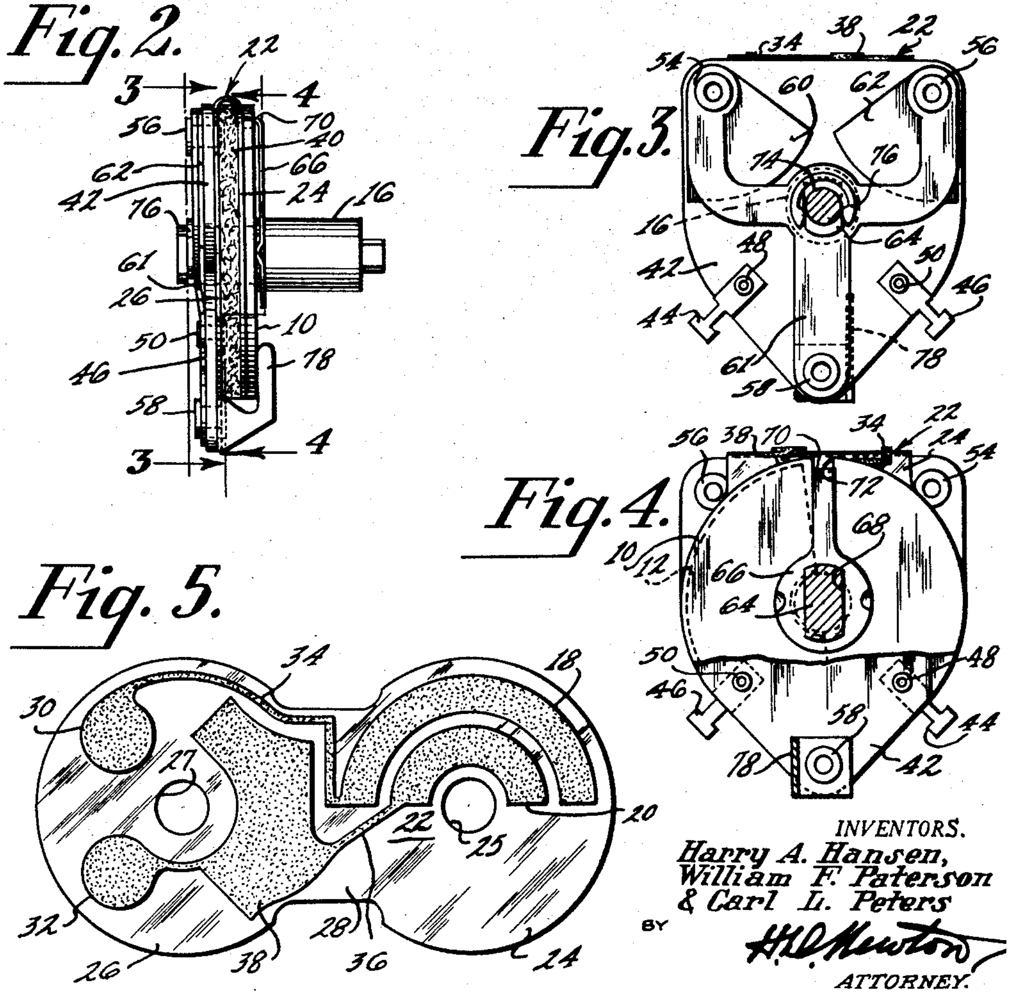
Figure 2 is a side view of the assembled miniature tuning capacitor shown in Figure 1.
Figure 3 is a rear view of the miniature tuning capacitor shown in Figure 2, taken on the section line 3—3 of Figure 2.
Figure 4 is a front view of the miniature tuning capacitor of Figure 2, taken on the section line 4—4 of Figure 2, partly broken away to show certain constructional details.
Figure 5 is a plan view of a flexible supporting sheet and main tuning capacitor stator plates and trimmer capacitor stator plates of the miniature tuning capacitor of the invention.

The stator plates for the separate sections of the miniature tuning capacitor, which can best be seen in Figure 5, comprise two separate concentric conductive coatings 18 and 20 which are formed on or affixed to a thin flexible sheet or support member 22 of insulating material. The flexible sheet 22 which may comprise a plastic film such as a vinyl of Mylar has two generally circular portions 24 and 26 joined by an interconnecting portion 28. The stator plates comprising the conductive coatings 18 and 20 respectively are deposited on the portion 24 of the flexible sheet 22 in any suitable manner such as by a printed circuit process using a conductive paint, or selectively etching undesired portions of a pattern from a metal clad plastic film.

The conductive coatings 18 and 20 occupy a semi-circular portion of the sheet 22 which is of approximately the same area as the rotor plate 12, but separated therefrom by the dielectric coating described above. The plates 18 and 20 are positioned for complete registry with the rotor plate 12 in one position of the disc 10, and to be completely out of registry with the rotor plate when the disc 10 is rotated 180°. This construction provides very little stray capacitance between the plates of the tuning capacitor. The advantage of minimizing stray capacitance between the rotor and stator plates is to enable a low minimum capacitance and thereby increase the minimum to maximum capacitance ratio. This is of importance if the capacitor is to be used as the tuning element of a signal receiver in order that the proper tuning range be provided.

Conductive paths are provided from the coatings 18 and 20 comprising the stator plates for the miniature variable capacitor, to a pair of terminal connection areas 30 and 32 on the portion 26 of the flexible insulating sheet or support member 22. The terminal connection area 30 is connected to the stator pltae 18 through the conductive pathway 34 and the terminal connection area 32 is connected to the stator plate 20 through the conductive pathway 36 and a relatively large conductive area 38 which comprises the stator element for a trimmer capacitor.

The conductive patterns on both portions 24 and 26 of the flexible insulating support member 22 may be formed at the same time to simplify the manufacture of the variable capacitor of the invention. Circular shaft receiving apertures 25 and 27 are provided at the centers of the support portions 24 and 26, and by properly positioning the conductive pattern with respect to these apertures, proper alignment of the trimmer capacitor stator plate 38 and the terminal connection areas 30 and 32 in the assembled capacitor structure may be easily attained.

A flat resilient circular pad 40 of foamed plastic such as a polyurethane material or the like is sandwiched between the separate portions 24 and 26 of the flexible insulating support 22. The resilient pad 40 is ordinarily under compression when all the parts are assembled and serves to press the flexible support, including the stator plates 18 and 20, into intimate conforming engagement with the surface of the disc 10, thereby eliminating air pockets which might otherwise occur between the stator plates 18 and 20 and the rotor plate 12. Even a very small air space would effect the capacitance considerably and prevent controlled tracking of the capacitance between the two main variable capacitor sections. For example, if the air space occurs near one of the stator plates, the incremental change in capacitance with movement of the rotor plate will be relatively much less than if the air space did not exist, while the incremental change in capacitance of the other capacitor will be of the normally expected amount.

A relatively rigid backing member 42 of a phenolic insulating material has a pair of circuit connection terminal members 44 and 46 secured thereto at positions for registry with the terminal connection areas 30 and 32 respectively on the flexible support member 22. The conductive terminals 44 and 46 are provided with eyelets 48 and 50 which extend through the backing member 42 to the side adjacent the terminal connection areas 30 and 32. When the tuning capacitor is assembled the eyelets 48 and 50 make contact with the terminal connection areas 30 and 32 which in turn are connected to the main tuning capacitor stator plates 18 and 20 as described. If desired, a suitable solder may be applied through the eyelets 48 and 50 to insure a more positive electrical connection between the terminal connection areas 30 and 32 and the eyelets 48 and 50 respectively.

Also mounted on the rear side of the backing member 42 is a Y-shaped yoke 61 of conductive material which is riveted to the backing member at the terminal end of each leg of the yoke with hollow rivets 54, 56 and 58. The junction of the legs of the yoke 61 at the approximate center of the backing member 42 defines a circular aperture which is coaxially positioned adjacent a similar aperture in the backing member, and through which the conductive shaft 16 extends.

A pair of conductive trimmer capacitor rotor plates 60 and 62 are affixed to the rear side of the backing member 42 for registry with the trimmer capacitor stator plate 38 by means of the rivets 54 and 56 respectively. These members are preferably held tightly by the rivets so that vibration of the tuning capacitor assembly will not easily change a desired setting of these plates. Two trimmer capacitor rotor plates are provided in the present instance so that a minimum trimmer capacitance variation may be obtained without the necessity of the trimmer plates extending beyond the limits of the backing member 42. It will be understood that the maximum capacitance of the trimmer capacitor unit is less than that of the main tuning capacitor due to the relatively greater spacing between the capacitor plates.

The shaft 16, which extends axially through the entire assembly, has a flat surface portion 64 for receiving an operating arm 66 with a complementary aperture 68. The outer end 70 of the operating arm is bent to fit into a slot 72 formed in the periphery of the disc 10. Thus as the shaft is rotated the motion is communicated to the disc 10 through the operating arm 66. If desired, the disc 10 may be keyed directly to the shaft. However, if the disc 10 is of a material which would not withstand the stress at the central aperture some means such as that described must be provided to prevent breakage of the disc 10.

The component parts of the capacitor are retained on the shaft 16 by a C washer 76 in a slot 74 on the shaft. The longitudinal dimension of the shaft between the operating arm 66 and the slot 74 is such that when the C washer is in place the components of the tuning capacitor are held in compression. In this manner the flexible support member 22 and the conductive patterns thereon are urged into intimate conforming engagement with the rigid backing member 42 and the disc 10 by the resilient pressure pad 40.

A stop 78 is affixed to the backing member 42 by the rivet 58 and includes an abutment extending over the disc 10 to engage the operating arm 66 and thereby limit the travel of the disc 10 at the maximum capacitance position. If desired, the stop may be set to limit the travel at any other position or may be omitted entirely.

As mentioned above, electrical connections to the respective stator plates 18 and 20 may be made by way of the terminals 44 and 46 respectively. The rotor plate for the capacitor is electrically connected through the shaft 16 to the yoke 61. A positive electrical connection between the shaft 16 and the yoke 61 is provided by the forces which press the conductive C washer 76 tightly against both the yoke 61 and the shaft. Thus electrical connection can be made to the common rotor for the two capacitor sections and to the rotor plate of the trimmer capacitor either through the shaft 16 or any of the hollow rivets 54, 56 and 58.

It can be seen that by prepositioning the conductive pattern on the support member 22 with respect to the central apertures, the main tuning capacitor stator plates will always be substantially aligned for cooperation with the rotor plate 12, and the trimmer capacitor stator plate 38 and the terminal connection areas 30 and 32 will be positioned for registry with the trimmer capacitor rotor plates 60 and 62 and the eyelets 48 and 50 respectively on the backing member 42. This feature permits the capacitor to be manufactured in mass production quantities while insuring the maintenance of tolerances within relatively narrow limits. The single piece construction of the support member or sheet not only simplifies manufacture and assembly of the miniature tuning capacitor, but contributes to the ruggedness of the unit.

In any position of the rotor plate 12, the capacitance to stator plate 18 is greater than the capacitance to the stator plate 20 because of the greater area of registry. When used in a signal receiver the capacitance between the stator plate 20 and the rotor plate 12 preferably tunes the oscillator circuit. A tracking adjustment for the oscillator circuit is provided by the capacitance between the trimmer capacitor stator plate 38 and the trimmer capacitor rotor plates 60 and 62. This adjustment is generally made near the high frequency end of the tuning range of the receiver to tune the oscillator circuit to a frequency separated from the signal frequency by an amount equal to the desired intermediate frequency. In most cases a tracking adjustment may be made at the low frequency end of the tuning range by adjusting a tuning inductance which is associated with the tuning capacitor sections 12—18 in the signal selection circuit.

In an alternative arrangement of a tuning capacitor constructed in accordance with the invention, the flexible supporting sheet on which the conductive pattern is deposited may also provide the dielectric between the rotor and stator plates of the main tuning capacitor sections. For example, with reference to Figure 6 a flexible supporting sheet 80 of a suitable dielectric, such as Teflon, comprises a pair of generally circular portions 82 and 84 joined by a connecting portion 86. A conductive pattern similar to that shown in Figure 5 is formed on the portions 82 and 84 and are interconnected by a pair of elongated conductive paths 34′ and 36′ respectively which extend across the elongated connection portion 86. Three apertures 88, 90 and 92 are provided in the flexible supporting sheet 80 for receiving the main tuning control shaft.

Figures 6, 7, 8, 9:
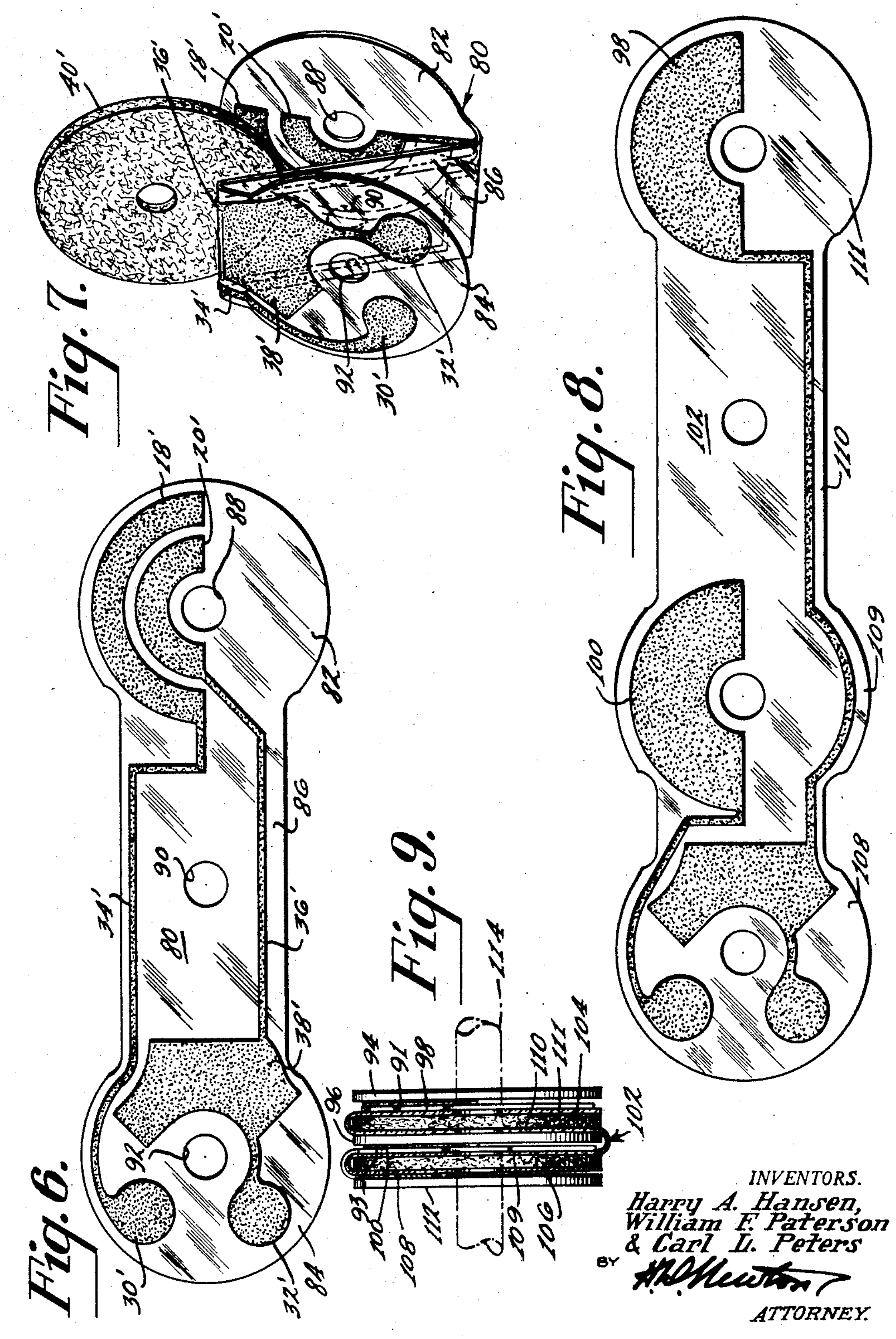
Figure 6 is a plan view of a modification of the flexible supporting sheet and capacitor plates shown in Figure 5 and embodying the invention.
Figure 7 is a perspective view of the flexible supporting sheet and plates shown in Figure 6 folded for assembly in the miniature tuning capacitor of the invention.
Figure 8 is a plan view of another modification of the flexible supporting sheet and plates for a ganged variable capacitor in accordance with the invention.
Figure 9 is a diagrammatic side view of a variable capacitor assembly including the flexible supporting sheet shown in Figure 8.

For assembly into the tuning capacitor structure the dielectric sheet 80 is folded as shown in Figure 7 so that the dielectric separates the stator plates 18′ and 20′ from the rotor plate 12 (not shown in Figure 7). The elongated connecting portion 86 is folded to the opposite side of the resilient pad 40′ and doubled back so that the conductive pattern including the trimmer plate 38′ and the terminal connection areas 30′ and 32′ on the supporting portion 84 face in the direction of the backing member (not shown in Figure 7). The other elements of the tuning capacitor may be the same as that shown in Figures 1 to 4 respectively. Naturally, if desired, other patterns can be used which may be printed on one or both sides of the flexible support.

It should be understood that a single flexible stator plate and associated trimmer capacitor and terminal connection areas may be provided in accordance with the invention to form a single variable capacitor unit. If desired two or more of these single variable capacitor units may be mounted on a common tuning shaft to form a single ganged tuning capacitor as is diagrammatically illustrated in Figure 9. In this modification of the invention separate rotor capacitor plates 91 and 93 which may be of the same configuration as the rotor plate 12 shown in Figure 1, are supported on the relatively rigid planar surfaces of the insulating discs 94 and 96 respectively. Separate flexible stator plates 98 and 100 are supported on a single flexible support member 102. The flexible stator plates as shown in Figure 8 are of semicircular configuration corresponding generally to the area of the rotor plates 91 and 93. A first resilient pressure pad 104 is positioned adjacent the stator plate 98 to urge the stator plate into intimate conformity with the surface of the disc 94. Likewise, a resilient pressure pad 106 is positioned adjacent the stator plate 100 to urge this plate into conformity with the surface of the disc 96. A suitable dielectric material separates the rotor and stator plates as described in connection with Figure 1.

A layout diagram of the flexible support member 102 is shown in Figure 8. The flexible support 102 comprises four separate sections 108, 109, 110 and 111. The stator plates 98 and 100 are deposited or otherwise formed on the sections 111 and 109 respectively and the terminal connection areas and trimmer stator capacitor plates are supported on the section 108. The section 110 provides a connecting portion to enable the flexible strip to be folded back on itself so that the conductive coating comprising the stator plate 100 will face in the direction of the rotor plate 92 when the flexible supporting member is assembled in the tuning capacitor unit.

The flexible support member is folded into the variable capacitor unit as diagrammatically illustrated in Figure 9 and is positioned so that the conductive coating comprising the stator plate 98 is facing in the direction of the insulating disc 94. The flexible support member is then folded back between the first pressure pad 104 and the second disc 96. Continuing, the support is folded around the second disc 96 so that the conductive coating comprising the second stator plate 100 is facing the second disc 96. The support member is then folded around the second resilient pressure pad so that the conductive areas comprising the terminal connection areas and the trimmer capacitor plate similar to those shown in Figure 1 are facing and adjacent a rigid backing member 112.

The first and second insulating discs 94 and 96 are keyed onto a shaft 114 for rotation when the shaft is rotated to simultaneously vary the capacitance of the two sections.

The miniature variable tuning capacitor described includes a trimmer capacitor as an integral part thereof and easily accessible terminal connection means at virtually no increase in the size of the unit and with only a minimum of additional expense. The manufacture and assembly of this capacitor is greatly facilitated since the main tuning capacitor stator plates and trimming capacitor stator plates can be formed on a single flexible support in one manufacturing operation. The single unit construction simplifies assembly and alignment of these plates for registry with the corresponding rotor plates.

What is claimed is:

1. A variable capacitor comprising in combination, a rotor member having a fixed axis of rotation and a rigid planar surface normal to said axis and including a conductive rotor plate for said capacitor, a stator member comprising a flexible sheet of insulating material having a conductive pattern thereon including a stator plate for said capacitor on a first portion of said sheet and further portions of said pattern on a second portion of said sheet, the first portion of said flexible sheet being positioned closely adjacent to and in parallel relation with the planar surface of said rotatable member for registry of said stator plate with said conductive rotor plate, a resilient flat pressure pad positioned with one side in contact with the first portion of the sheet to hold said first portion in intimate contact and conformity with the planar surface of the said rotatable member, the second portion of said sheet being joined to the first portion by a fold and being positioned in a plane parallel to that of said first portion on the opposite side of said resilient pressure pad, and means for mounting and holding said rotor and stator members and the pressure pad in axially compressed and assembled relation.

2. A variable tuning capacitor comprising in combination, a rotatable member having a rigid planar surface including a conductive rotor plate for said tuning capacitor, a shaft element for rotating said member having an axis normal to said planar surface, a flexible sheet of insulating material having a conductive pattern thereon including a stator plate for said tuning capacitor on a first portion of said sheet and a stator plate for a trimmer capacitor on a second portion of said sheet, the first portion of said flexible sheet being positioned adjacent to and in close parallel relation to the planar surface of said rotatable member so that said tuning capacitor stator plate is in registry with said conductive rotor plate, means including a resilient pressure pad positioned to hold said first portion of said sheet including said stator plate in intimate contact and conformity with the planar surface of said rotatable member, the second portion of said flexible sheet including said trimmer capacitor stator plate being positioned in a plane parallel to said first portion of said sheet and on the opposite side of said resilient pressure pad, means including a backing member for holding said elements in compressed assembled relation, and means providing a movable trimmer capacitor plate positioned on said backing member for registry with said trimmer capacitor stator plate.

3. A multi-section ganged tuning capacitor comprising in combination, a rotatable control shaft, an insulating rotor disc having a rigid planar surface including a semi-circular conductive rotor plate for said capacitor axially mounted on said control shaft, said rotor disc connecting said rotor plate with said control shaft, a flexible insulating support member having a first and second portions each with an opening therein, the first portion of said flexible support member being positioned adjacent said disc with said shaft extending through the opening therein, said support member being folded so that said shaft also extends through the opening in the second portion thereof, means providing a backing member having an opening through which said shaft extends positioned adjacent the second portion of said flexible support member, movable trimmer capacitor plate means and circuit connection terminal means on said backing member, a pair of individual concentric tuning capacitor stator plates occupying a semi-circular area generally corresponding to the area of said rotor plate on the first portion of said support member and positioned for registry with said rotor plate, a trimmer capacitor stator plate and a pair of terminal connection areas on the second portion of said support member, means connecting one of said terminal connection areas with said trimmer capacitor stator plate and with one of said tuning capacitor stator plates, means connecting the other of said terminal connection areas with the other tuning capacitor stator plate, said trimmer capacitor stator plate and terminal connection areas being positioned on said flexible support member for registry with the movable trimmer capacitor plate means and the circuit connection terminal means respectively on said backing member, resilient pressure pad means positioned between the first and second portions of said flexible support member, and means for maintaining the assembly including said flexible support member and said resilient pressure pad means in compression between said insulating rotor disc and said backing member.

4. A ganged variable tuning capacitor comprising in combination, a rotatable control shaft, an insulating disc having a rigid planar surface including a conductive rotor plate for said capacitor axially mounted on said control shaft, a flexible insulating support member comprising first and second portions each having an opening therein, said first portion of the flexible support member positioned adjacent said insulating disc with said shaft extending through the opening therein, said support member having a fold so that said shaft extends through the opening in said second portion thereof, a backing member having an opening through which said shaft passes positioned adjacent the second portion of said flexible support, a movable trimmer capacitor plate mounted on said backing member, a pair of individual flexible stator plates for said capacitor on the first portion of said support for registry with but insulated from said conductive rotor plate, a flexible trimmer capacitor stator plate supported on the second portion of said support member for registry with but insulated from said movable trimmer capacitor plate, resilient pressure pad means positioned between the first and second portions of said flexible support member, and means for maintaining the assembly including said flexible support member and said resilient pressure pad means in compression between said insulating disc and said backing member.

5. A multi-section ganged tuning capacitor comprising in combination, a rotatable control shaft, an insulating rotor disc having a rigid planar surface including a semi-circular conductive rotor plate for said capacitor mounted on said control shaft for rotation therewith in a plane normal to the axis of said shaft, a flexible insulating support member having first and second substantially flat sheet portions each with an opening therein, the first portion of said flexible support member being positioned adjacent to and in parallel relation with one face of the rotor disc with said shaft extending through the opening therein, said support member having a fold between the first and second portions thereof whereby said portions are in spaced parallel relation and said shaft also extends through the opening in the second portion thereof, a substantially rigid flat backing member having an opening through which said shaft extends positioned adjacent the second portion of said flexible support member, a pair of individual concentric tuning capacitor stator plates affixed in a semi-circular area generally corresponding to the area of said rotor plate on the first portion of said support member and positioned for registry with said rotor plate, means providing a pair of conductive terminal connection areas on the second portion of said support member, means connecting one of said terminal connection areas with one of said tuning capacitor stator plates, means connecting the other of said terminal connection areas with the other tuning capacitor stator plate, resilient pressure pad means positioned between the first and second portions of said flexible support member, and means for maintaining the assembly including said flexible support member and said resilient pressure pad means in compression between said rotor disc and said backing member.

6. A ganged variable tuning capacitor comprising in combination, a rotatable control shaft, an insulating disc having a rigid planar surface including a conductive rotor plate for said capacitor axially mounted on said control shaft, a flexible insulating support member comprising first and second portions each having an opening therein, said first portion of the flexible support member being positioned adjacent said insulating disc with said shaft extending through the opening therein, said support member having a fold so that said shaft extends through the opening in the second portion thereof, a substantially rigid backing member having an opening through which said shaft passes positioned adjacent the second portion of said flexible support member, a pair of individual flexible stator plates for said capacitor on the first portion of said support member for registry with and insulated from said conductive rotor plate, resilient pressure pad means positioned between the first and second portions of said flexible support member, and means for maintaining the assembly including said flexible support member and said resilient pressure pad means in compression between said insulating disc and said backing member.

References Cited in the file of this patent

UNITED STATES PATENTS

| | | |
|---|---|---|
| 1,548,801 | Jacobs | Aug. 4, 1925 |
| 1,647,474 | Seymour | Nov. 1, 1927 |
| 2,535,367 | Minnium | Dec. 26, 1950 |
| 2,581,966 | Mitchell | Jan. 8, 1952 |
| 2,693,557 | Kodama | Nov. 2, 1954 |